(12) United States Patent
Lindner et al.

(10) Patent No.: US 9,470,304 B2
(45) Date of Patent: Oct. 18, 2016

(54) VEHICLE HAVING A GEARBOX AND A MANUALLY OPERATED SELECTOR DEVICE

(71) Applicant: Bayerische Motoren Werke Aktiengesellschaft, Munich (DE)

(72) Inventors: Matthias Lindner, Graefelfing (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 636 days.

(21) Appl. No.: 13/914,771

(22) Filed: Jun. 11, 2013

(65) Prior Publication Data

US 2013/0269463 A1      Oct. 17, 2013

Related U.S. Application Data

(63) Continuation of application No. PCT/EP2012/000167, filed on Jan. 17, 2012.

(30) Foreign Application Priority Data

Feb. 18, 2011   (DE) .................. 10 2011 004 388

(51) Int. Cl.
   *F16H 59/10*   (2006.01)
   *F16H 59/02*   (2006.01)

(52) U.S. Cl.
   CPC ........ *F16H 59/0278* (2013.01); *F16H 59/105* (2013.01); *Y10T 74/2014* (2015.01)

(58) Field of Classification Search
   CPC .......................... F16H 59/105; F16H 59/0278

USPC .......................................... 74/473.21, 473.23
See application file for complete search history.

(56) References Cited

U.S. PATENT DOCUMENTS

| | | | |
|---|---|---|---|
| 5,179,867 A | 1/1993 | Sakakibara et al. | |
| 6,474,186 B1 | 11/2002 | Vollmar | |
| 2003/0188594 A1 | 10/2003 | Levin et al. | |
| 2004/0041689 A1* | 3/2004 | DeBono ............... | B60R 25/066 340/5.52 |
| 2006/0042412 A1 | 3/2006 | Marhefka et al. | |
| 2011/0032077 A1* | 2/2011 | Setlak .................. | G06K 9/0002 340/5.83 |

FOREIGN PATENT DOCUMENTS

| | | |
|---|---|---|
| DE | 40 42 045 A1 | 7/1991 |
| DE | 93 20 309 U1 | 5/1994 |
| DE | 199 51 374 A1 | 5/2001 |
| DE | 100 03 140 C1 | 8/2001 |
| DE | 10 2006 019 065 A1 | 10/2007 |

(Continued)

OTHER PUBLICATIONS

German-language Examination Report dated Jan. 4, 2012 with English translation (Eleven (11) pages).

(Continued)

*Primary Examiner* — William C Joyce
(74) *Attorney, Agent, or Firm* — Crowell & Moring LLP

(57) ABSTRACT

A vehicle having a gearbox, a gear control unit and a manually operable selector device, which is electrically connected to the gear control unit and which is provided for selecting different states of the gearbox, includes a sensor device, by which it is possible on actuation of the selector device, to detect whether the selector device is being actuated by a human body part or in some other way.

15 Claims, 2 Drawing Sheets

(56) References Cited

FOREIGN PATENT DOCUMENTS

| | | |
|---|---|---|
| DE | 10 2007 036 086 A1 | 2/2009 |
| DE | 10 2007 037 750 A1 | 2/2009 |
| EP | 1 182 381 A2 | 2/2002 |
| EP | 1 541 903 A1 | 6/2005 |
| EP | 1 770 311 A1 | 4/2007 |
| WO | WO 03/091605 A1 | 11/2003 |

OTHER PUBLICATIONS

International Search Report dated Aug. 14, 2012 with English translation (Eight (8) pages).

\* cited by examiner

VEHICLE HAVING A GEARBOX AND A MANUALLY OPERATED SELECTOR DEVICE

CROSS REFERENCE TO RELATED APPLICATIONS

This application is a continuation of PCT International Application No. PCT/EP2012/000167, filed Jan. 17, 2012, which claims priority under 35 U.S.C. §119 from German Patent Application No. DE 10 2011 004 388.8, filed Feb. 18, 2011, the entire disclosures of which are herein expressly incorporated by reference.

This application contains subject matter related to U.S. application Ser. No. 13/914,783, entitled "Vehicle With a Selector Device for Selecting Different States of a Transmission," filed on even date herewith.

BACKGROUND AND SUMMARY OF THE INVENTION

The present invention relates to a vehicle having a gearbox, a gearbox control unit which is electrically connected to the gearbox, and a selector device which can be actuated by hand and which is electrically connected to the gearbox control unit.

A monostable selector lever for a motor vehicle gearbox is known from DE 2007 037 750 A1. The selector lever is electrically connected to a gearbox control unit. It is possible to select the individual operating states (forward drive, neutral, reverse drive, manual operation) by means of displacing the selector lever from a prespecified, non-actuated base position.

A plurality of other, so-called "shift-by-wire" selector elements are known from the prior art, designed for example as selector levers which are arranged projecting from the center console and are able to pivot upward from the same, such as rotary dials or buttons. Selector levers currently used in BMW vehicles have a so-called "unlock button." When the vehicle transmission is in the neutral position or in the drive position, it is only possible to shift into the reverse position if the unlock button is pressed-in during the actuation of the selector lever.

The selector levers known in the prior art are conceptualized in such a manner that they are gripped and actuated by use of one's entire hand. Such selector levers require a corresponding large amount of space. The larger a selector lever is designed, the more stably the entire arrangement must be constructed in order to withstand "abusive forces" of up to 80 N.

The problem addressed by the invention is that of creating a vehicle having a gearbox selector device which can be designed in a comparatively small manner.

This problem is addressed by providing a vehicle having a gearbox, a gearbox control unit which is electrically connected to the gearbox, and a selector device which can be actuated by hand and which is electrically connected to the gearbox control unit. A sensor device in included and it is possible to detect by way of the sensor device whether the sensor device, when actuated, is being actuated by a human body part or in another manner. Advantageous embodiments and implementations of the invention are further described and claimed herein.

A basic aspect of the invention consists of a vehicle having a gearbox, a gearbox control unit included for the purpose of controlling the gearbox, and a selector device which is actuated manually and is given the most compact possible design while no longer having an unlock button in the conventional sense.

The basic principle of the invention consists of a sensor device which can be used to detect whether, when the selector device is actuated, the selector device is being actuated by a human body part, particularly a human finger, or is being actuated in another manner. "In another manner" includes particularly the type of actuations where the selector device is actuated unintentionally—for example when the selector device is bumped by an object or the like.

The sensor device can be designed as a contact sensor, which recognizes whether the selector device has been touched and actuated by a human hand and/or a human finger, or has been actuated in another manner. Such a contact sensor device can be designed to function on the basis of various physical functional principles—by way of example as a visual contact sensor, as a capacitive sensor, as a sensor which is based on infrared radiation and/or changes in temperature, etc.

In principle, various different fingerprints or handprints of one or more drivers could be saved in an electronic device of the vehicle, and when the selector device is actuated, it could detect whether the saved and known skin pattern is present on the same.

According to one implementation of the invention, the sensor device is at least partially integrated into the selector device and/or into a selector element of the selector device, meaning integrated with at least one or more of its components.

The selector device can be a so-called monostable selector device. The term "monostable" means that the selector device always returns following actuation thereof into a prespecified, non-actuated position. For this purpose, a spring-based return device can be included which moves the selector device "automatically" back into the prespecified non-actuated base position following actuation thereof.

The selector device can particularly be designed and constructed in such a manner that it can be actuated by finger, particularly by use of only one finger. In contrast to conventional automatic transmission selector levers, designed for actuating forces of 25-35 N, the selector device according to the invention can be actuated with a significantly smaller actuating force of less than 10 N, by way of example.

According to one implementation of the invention, the selector device can be moved starting from a non-actuated position, against a "return force," into a first actuated position. In addition, the selector device can furthermore be moved starting from the first position, against a return force, into a second actuated position. In this case, a pressure point—meaning a local or absolute return force maximum—can be included in the configuration, which must be overcome at the transition from the first to the second position.

By way of example, the operating positions "drive" (D), "neutral" (N), and/or "coast" (N) and "reverse" (R) can be selected by means of the selector device.

If the vehicle transmission is in the "drive" position, for example, according to the configuration the neutral position can be selected by actuating the selector device from the non-actuated position into the first position, or the reverse operating position can be selected by further actuation into the second operating position.

In this case, according to the configuration, the gearbox control unit can only generate a control signal to shift from one operating position into another operating position—for example the operating position D or N into R and/or from R into D—if a signal generated by the sensor device is present, said signal showing that the selector device has in fact been actuated by a finger and/or multiple fingers, or a hand, and not perhaps unintentionally or in another manner.

The selector device can have a selector element which is arranged to be able to pivot with respect to a pivot axis. The pivot axis can run transverse to the direction of travel and/or longitudinal dimension of the vehicle, for example. The selector element can be pivoted in a first direction (for example in the direction of travel) and in a second direction which is opposite to the first direction (for example opposite the direction of travel).

A first and a second piezometric surface can be included on the selector element. The selector element can be pivoted in the first direction by way of pressure applied on the first piezometric surface, and in the second direction by way of pressure applied on the second piezometric surface.

The selector element can be designed as a rocker switch. On a rocker switch, the pivot axis is located in the region between the two piezometric surfaces.

As an alternative, the selector element can also be designed as a lever-like element, similar to the "shifters" installed in current BMW model vehicles, included for the purpose of controlling the power window lifter. In the case of such a lever-like selector element, the two piezometric surfaces are formed by sides of the lever-like element which face each other, and the lever-like element is mounted pivotably in the region of one of its ends. The latter feature is also the essential difference in comparison to a rocker switch, because in that case the pivot mount is located in a central region of the selector element.

The selector element according to the invention can be arranged in the region of a center console of the vehicle, for example. As an alternative, the selector element can also be arranged in the region of a steering wheel of the vehicle, or directly on a front side facing the driver of the steering wheel, or reverse side facing away from the driver of the steering wheel.

In summary, the following advantages are achieved by way of the invention:

cost savings resulting from miniaturization, compared to conventional selector levers,
reduction in constructed space,
reduction in weight,
faster and more comfortable operation, and
a plurality of options for arrangement in a vehicle Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
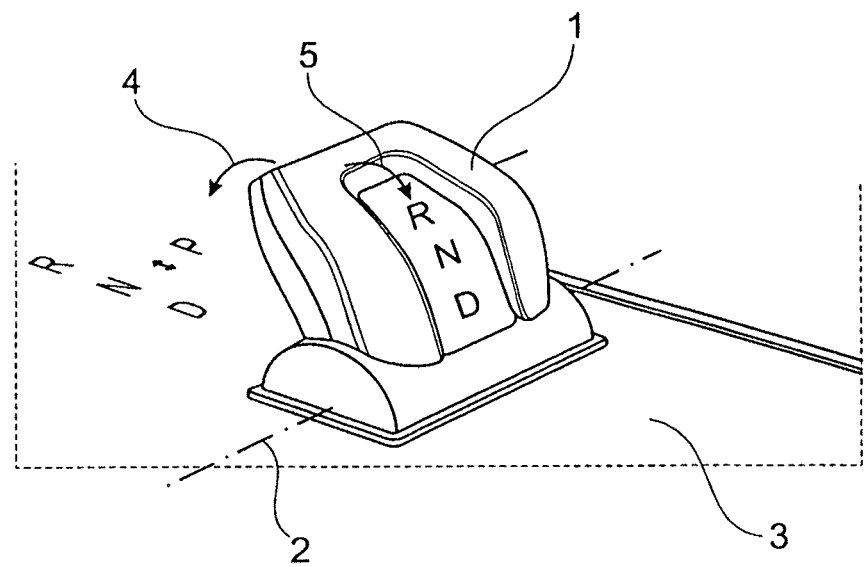
FIG. 1 is a perspective illustration of a selector element according to an embodiment of the invention.

FIG. 1 shows a selector element 1 which is included for the purpose of selecting between various positions and/or operating positions of a vehicle transmission, which is not illustrated in greater detail here. The selector element 1 is able to pivot about a pivot axis 2 which runs transverse to the longitudinal direction of the vehicle.

As can be seen in FIG. 1, the selector element 1 can be arranged in the region of a center console 3 of a vehicle. Compared to conventional selector levers, the selector element 1 has a substantially smaller, more compact and/or flatter design. By way of example, it is possible for the selector element to have a maximum height of 40 mm, meaning that is stands a maximum of 40 mm higher than the center console 3.

The selector element 1 can be operated by use of a finger. It can be moved forward and/or in the direction of travel, corresponding to the arrow 4, or in the opposite direction, corresponding to the arrow 5. When in the non-actuated position, the selector element 1 always returns to a defined base position. As such, it is a so-called "monostable element."

By way of example, if the vehicle transmission is in the D position, the neutral position N can be selected by pivoting the selector element 1 in the direction of the arrow 4, meaning forward. By overcoming a pressure point, meaning by pivoting the selector element 1 farther forward, it is possible to shift into the reverse drive position R. The opposite can be performed, by way of example, by shifting from the reverse drive position R, pivoting backward in the direction of the arrow 5 into the neutral position N and/or by overcoming a pressure point, into the drive position D.

A contact sensor device which is not illustrated in greater detail here is integrated into the selector element 1, and detects whether the selector element 1 is actuated by a human body part—particularly by a finger—or in another manner, when an actuation of the selector element 1 is detected. In this way, it is possible to recognize and dismiss unintentional misoperation. This means that a signal to switch the transmission from one operating position into another operating position is only generated if the contact sensor device detects that the selector element 1 is actuated by a human body part.

Figure 2:
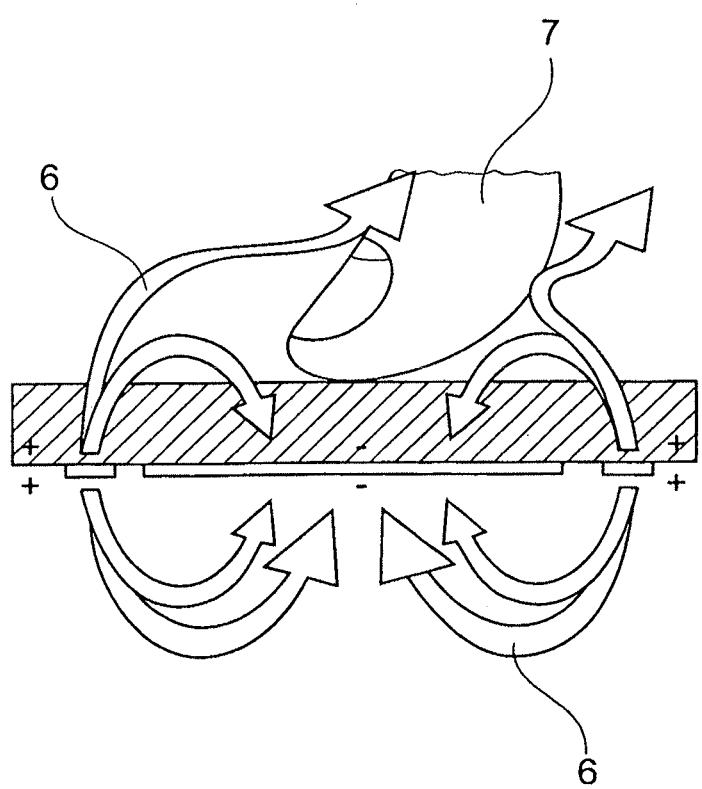
FIG. 2 shows the basic principle of a contact sensor device which can be integrated into the selector element of Figure, for example.
Figure 3:
FIG. 3 shows a rocker switch according to an embodiment of the invention.
Figure 4:
FIG. 4 shows a lever element according to an embodiment of the invention.

FIG. 2 shows how such a contact sensor device may be designed, in a highly schematic illustration. By way of example, two positive electrodes and one negative electrode can be integrated into the selector element 1. Electrical fields, which are illustrated here by field lines 6, form between the negative electrode and the two positive electrodes. If the driver touches the selector element 1 with a finger 7, the electric field generated by the electrodes as a result is deformed and/or weakened in a defined manner, which in turn can be detected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a gearbox;
   a gearbox control unit electrically coupled to the gearbox;
   a selector device actuatable by hand and being electrically coupleable to the gearbox control unit, the selector device being operatively configured to select various positions of the gearbox; and a sensor device operatively configured and arranged to detect whether the selector device, when actuated, is actuated via a human body part or in another manner, wherein
   the selector device comprises a selector element arranged to pivot about a pivot axis,
   the selector element is pivotable in a first direction and in a second direction opposite the first direction,
   the selector element has first and second piezometric surfaces, and
   the selector element is a rocker switch, the pivot axis of the rocker switch being located in a region between the first and second piezometric surfaces.

2. The vehicle according to claim 1, wherein at least one component of the sensor device is integrated into the selector device.

3. The vehicle according to claim 1, further comprising:
a restoring device operatively configured to always restore the selector device back into a predefined, non-actuated position following actuation of the selector device.

4. The vehicle according to claim 3, wherein the selector device is movable into a first actuated position, against a return force of the restoring device, starting from the non-actuated position.

5. The vehicle according to claim 4, wherein the selector device is further movable into a second actuated position, against a return force of the restoring device, starting from the first actuated position.

6. The vehicle according to claim 5, further comprising a pressure point of the selector element, the pressure point being designed such that it must be overcome at a transition between the first actuated position and the second actuated position.

7. The vehicle according to claim 1, wherein the selector device is operatively configured to be actuatable by a human body finger.

8. The vehicle according to claim 7, wherein the selector device is operatively configured to be actuatable via only one finger.

9. The vehicle according to claim 8, wherein the selector device is operatively configured to be actuable via an actuating force of less than 10 N.

10. The vehicle according to claim 1, wherein the selector device is operatively configured to be actuable via an actuating force of less than 10 N.

11. The vehicle according to claim 1, wherein the gearbox comprises drive, neutral, and reverse operating positions.

12. The vehicle according to claim 11, wherein the gearbox control device is operatively configured to only generate a control signal to shift from the drive or neutral operating positions into the reverse operating position and/or, from the reverse operating position into the drive operating position if a signal generated by the sensor device is present, said signal indicating that the selector device has been actuated by the human body part.

13. The vehicle according to claim 1, wherein the selector element is a lever element, and further wherein the first and second piezometric surfaces are formed on opposing sides of the lever element.

14. The vehicle according to claim 1, wherein the selector device is arranged in a center console region of the vehicle.

15. The vehicle according to claim 1, wherein the selector device is arranged in a region of or on a steering wheel of the vehicle.

* * * * *